F. S. NELSON.
SHOCK ABSORBER.
APPLICATION FILED FEB. 2, 1914.
1,123,916.
Patented Jan. 5, 1915.
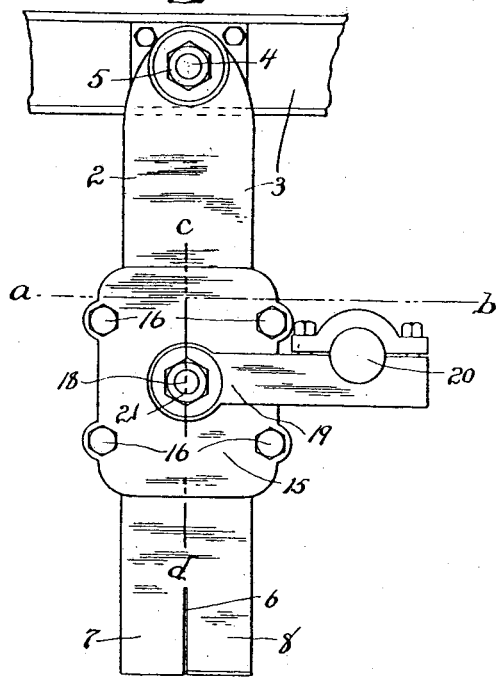
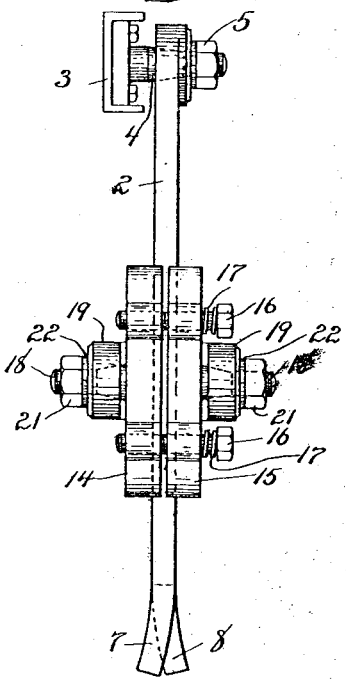
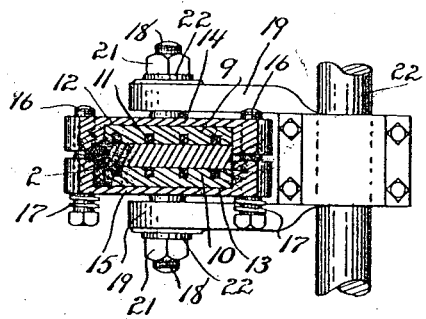
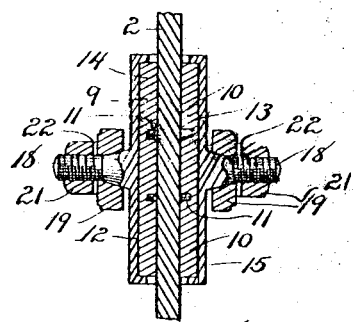
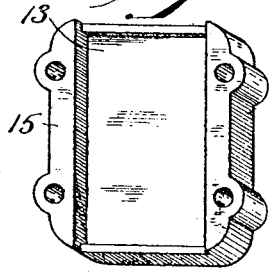
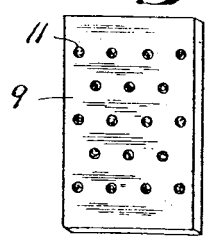

UNITED STATES PATENT OFFICE.

FREDERICK S. NELSON, OF NEW HAVEN, CONNECTICUT.

SHOCK-ABSORBER.

1,123,916.  Specification of Letters Patent.  Patented Jan. 5, 1915.

Application filed February 2, 1914. Serial No. 815,990.

*To all whom it may concern:*

Be it known that I, FREDERICK S. NELSON, a citizen of the United States, residing at New Haven, in the county of New Haven and State of Connecticut, have invented a new and useful Improvement in Shock-Absorbers; and I do hereby declare the following, when taken in connection with the accompanying drawings and the characters of reference marked thereon, to be a full, clear, and exact description of the same, and which said drawings constitute part of this application, and represent, in—

Figure 1 a side view of a shock absorber constructed in accordance with my invention. Fig. 2 an edge view of the same. Fig. 3 a sectional view on the line $a$—$b$ of Fig. 1. Fig. 4 a sectional view on the line $c$—$d$ of Fig. 1. Fig. 5 a perspective view of one of the plate-holders, detached. Fig. 6 a perspective view of one of the friction plates, detached.

This invention relates to an improvement in shock absorbers such as are commonly applied to automobiles to limit or restrain the action of the spring when going over uneven spots in a road, and so as to prevent sudden jolting.

The object of this invention is to provide a shock absorber in which friction is applied in substantially the line of thrust, and so that undue strain is avoided; and the invention consists in certain details of construction as will be hereinafter described and particularly recited in the claims.

In carrying out my invention, I employ a slide 2 preferably formed from a strip of steel of the desired width and thickness, the strip being adapted to be secured to a vehicle frame 3 in any suitable manner. As herein shown, it is suspended upon a tapered plug 4 to which it is secured by a nut 5, and so that a certain amount of wear may be taken up. Preferably the lower end of this strip is divided by a vertical cut 6 and the divided ends 7 and 8 turned one forward and the other backward for the purpose as will hereinafter appear. This slide passes downward between two friction plates 9 and 10 of any suitable material such as wood or fiber. Preferably and as shown the adjacent faces of these plates will be formed with holes or recesses 11 for graphite or other suitable lubricating material. These plates 9 and 10 are respectively located in pockets 12 and 13 respectively formed in correspondingly formed plate-holders 14 and 15 which are adapted to be connected together by bolts 16, and preferably and as shown springs 17 will be inserted beneath the heads of the bolts so that the plate-holders may have more or less yielding movement and they are provided on their outer faces with outwardly projecting tapered studs 18 to receive the ends of a yoke 19 which is secured to an axle 20. By employing tapered studs and tapering the ends of the yoke 19, provision is made for taking up wear. The ends of the yokes are respectively held in place by nuts 21 beneath which I preferably place spring washers 22. The slide, as before stated, is connected with the frame of a vehicle and extends downward between the friction plates 9 and 10 and the plate-holders are crowded together to give the required amount of friction. Then as the body of the car moves up and down with respect to the axle, the slide will move up and down between the friction plates and prevent any sudden or undue motion; and as the movement of the slide between the friction plates is in line with the line of thrust, no undue strain is placed upon the parts. By separating the lower ends of the slides it is practically impossible to withdraw the slide from between the plates as these ends would impose additional friction so that a stop is provided to limit the movement of the slide, but this stop is a yielding one and would prevent any shock.

I claim:—

1. A shock absorber comprising a slide, a pair of plate-holders adjustably connected together, said plate-holders formed with pockets, friction plates located in said pockets and on opposite sides of said slide, said plate-holders provided with outwardly projecting studs, and a yoke connected with said studs and by which the plates are supported.

2. A shock absorber comprising a slide divided at its lower end, a pair of plate-holders adjustably connected together, said plate-holders formed with pockets, friction plates located in said pockets and on opposite sides of said slide, said plate-holders formed with outwardly projecting studs, and a yoke connected with said studs and by which the plates are supported.

In testimony whereof, I have signed this specification in the presence of two subscribing witnesses.

FREDERICK S. NELSON.

Witnesses:
 URIAH G. KELLER,
 RICHARD L. CARTER.